US012749445B2

(12) United States Patent
Kim et al.

(10) Patent No.: US 12,749,445 B2
(45) Date of Patent: *Sep. 29, 2026

(54) PIXEL CIRCUIT FOR FORMING SLIM BEZEL AND DISPLAY DEVICE INCLUDING THE SAME

(71) Applicant: LG Display Co., Ltd., Seoul (KR)

(72) Inventors: Taehwi Kim, Paju-si (KR); Juhnsuk Yoo, Paju-si (KR); Jungchul Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/097,716

(22) Filed: Apr. 1, 2025

(65) Prior Publication Data

US 2026/0080823 A1 Mar. 19, 2026

Related U.S. Application Data

(63) Continuation of application No. 18/514,762, filed on Nov. 20, 2023, now Pat. No. 12,293,717, which is a
(Continued)

(30) Foreign Application Priority Data

Dec. 27, 2021 (KR) ........................ 10-2021-0188024

(51) Int. Cl.
*G09G 3/3233* (2016.01)
*G09G 3/3266* (2016.01)
*G09G 3/3291* (2016.01)

(52) U.S. Cl.
CPC ......... *G09G 3/3233* (2013.01); *G09G 3/3266* (2013.01); *G09G 3/3291* (2013.01);
(Continued)

(58) Field of Classification Search
CPC .. G09G 3/3233; G09G 3/3266; G09G 3/3291; G09G 2300/0426;
(Continued)

(56) References Cited

U.S. PATENT DOCUMENTS 10,573,226 B1 * 2/2020 Ma ........................ G06F 1/1688
11,862,090 B2 1/2024 Kim et al.
(Continued)

FOREIGN PATENT DOCUMENTS

CN 105469761 A 4/2016
CN 107564468 A 1/2018
(Continued)

OTHER PUBLICATIONS

China National Intellectual Property Administration, Office Action, Chinese Patent Application No. 202211586600.1, Apr. 29, 2025, 19 pages.
(Continued)

*Primary Examiner* — Rodney Amadiz
(74) *Attorney, Agent, or Firm* — Fenwick & West LLP

(57) ABSTRACT

A pixel circuit and a display device including the same are disclosed. The pixel circuit includes: a driving transistor which includes a first electrode connected to a first node, a gate electrode connected to a second node, and a second electrode connected to a third node, and supplies a driving current to a light emitting device; a first transistor that is electrically connected between the first node and the second node; a second transistor that is electrically connected between the first node and a data voltage; a third transistor that is electrically connected between the first node and a power supply line that supplies a high potential voltage; and a storage capacitor that includes a first electrode connected to the high potential voltage and a second electrode connected to the second node.

9 Claims, 14 Drawing Sheets

Related U.S. Application Data continuation of application No. 17/989,357, filed on Nov. 17, 2022, now Pat. No. 11,862,090.

(52) U.S. Cl.
CPC ............... *G09G 2300/0426* (2013.01); *G09G 2300/0842* (2013.01); *G09G 2310/0278* (2013.01); *G09G 2320/0233* (2013.01)

(58) Field of Classification Search
CPC ... G09G 2300/0842; G09G 2310/0278; G09G 2320/0233; G09G 2300/0819; G09G 2300/0852; G09G 2300/0861; G09G 2310/0262; G09G 2310/08; G09G 2320/045; G09G 3/3208; H10K 59/121; H10K 59/131
See application file for complete search history.

(56) References Cited

U.S. PATENT DOCUMENTS

| | | | | |
|---|---|---|---|---|
| 12,293,717 | B2 * | 5/2025 | Kim | G09G 3/3233 |
| 2018/0006099 | A1 | 1/2018 | Ka et al. | |
| 2018/0047759 | A1 | 2/2018 | Zhao et al. | |
| 2019/0066598 | A1 | 2/2019 | Kim et al. | |
| 2020/0226978 | A1 | 7/2020 | Lin et al. | |
| 2021/0057458 | A1 | 2/2021 | Kim et al. | |
| 2021/0183303 | A1 | 6/2021 | Kim et al. | |
| 2021/0225282 | A1 | 7/2021 | Cho et al. | |
| 2021/0264857 | A1 | 8/2021 | Wang et al. | |
| 2022/0310005 | A1 | 9/2022 | Chen | |
| 2022/0319418 | A1 | 10/2022 | Yu | |
| 2023/0079102 | A1 | 3/2023 | Kim et al. | |
| 2023/0123397 | A1 | 4/2023 | Huang et al. | |
| 2023/0143180 | A1 | 5/2023 | Song et al. | |
| 2023/0145805 | A1 | 5/2023 | Kim et al. | |
| 2023/0154405 | A1 | 5/2023 | Noh et al. | |
| 2024/0257738 | A1 | 8/2024 | Ha et al. | |

FOREIGN PATENT DOCUMENTS

| | | | |
|---|---|---|---|
| CN | 109377929 | A | 2/2019 |
| CN | 110942742 | A | 3/2020 |
| CN | 111435587 | A | 7/2020 |
| CN | 112490252 | A | 3/2021 |
| CN | 112992049 | A | 6/2021 |
| KR | 10-2018-0072440 | A | 6/2018 |
| KR | 10-2020-0087711 | A | 7/2020 |

OTHER PUBLICATIONS

Korean Intellectual Property Office, Office Action, Korean Patent Application No. 10-2021-0188024, Jul. 14, 2025, 13 pages.
China National Intellectual Property Administration, Second Office Action, Chinese Patent Application No. 202211586600.1, Aug. 26, 2025, 30 pages.
China National Intellectual Property Administration, Decision of Rejection, Chinese Patent Application No. 202211586600.1, Sep. 30, 2025, 34 pages.
United States Office Action, U.S. Appl. No. 17/989,357, Jun. 20, 2023, 13 pages.
United States Office Action, U.S. Appl. No. 18/514,762, Jun. 4, 2024, 10 pages.
United States Office Action, U.S. Appl. No. 18/514,762, Sep. 6, 2024, 13 pages.

* cited by examiner

PIXEL CIRCUIT FOR FORMING SLIM BEZEL AND DISPLAY DEVICE INCLUDING THE SAME

CROSS-REFERENCE TO RELATED APPLICATION

This application is a continuation of U.S. patent application Ser. No. 18/514,762 filed on Nov. 20, 2023, which is a continuation of U.S. patent application Ser. No. 17/989,357 filed on Nov. 17, 2022, which claims priority from Republic of Korea Patent Application No. 10-2021-0188024 filed on Dec. 27, 2021, each of which is hereby incorporated by reference in its entirety.

TECHNICAL FIELD

The present disclosure relates to a pixel circuit and a display device including the same.

BACKGROUND

The active-matrix type organic light emitting diode display includes an organic light emitting diode (OLED) that emits light by itself, and has a rapid response speed, a high light emission efficiency, a high luminance, and a large view angle.

An organic light emitting diode that is a self-light emitting device, includes an anode electrode, a cathode electrode, and an organic compound layer (HIL, HTL, EML, ETL, and EIL as described below) formed between them. The organic compound layer includes a hole injection layer (HIL), a hole transport layer (HTL), an emitting material layer (EML), an electron transport layer (ETL), and an electron injection layer (EIL). When a driving voltage is applied to the anode electrode and the cathode electrode, the holes that have passed through the hole transport layer (HTL) and electrons that have passed through the electron transport layer (ETL) move to the emitting material layer (EML) and form excitons, and as a result, the emitting material layer (EML) produces visible light.

The organic light emitting display device includes a driving transistor (thin film transistor) for controlling a driving current flowing through the organic light emitting diode. It is ideal that the electrical characteristics of the driving transistor such as a threshold voltage, mobility, etc., are designed to be the same in all the pixels. However, in reality, due to process conditions, driving environment, and the like, the electrical characteristics of the driving transistor are non-uniform for each pixel. For this reason, the driving current according to the same data voltage varies for each pixel, and as a result, a luminance deviation occurs between the pixels. In order to solve this problem, known is an image quality compensation method for reducing luminance non-uniformity by sensing characteristic parameters (threshold voltage Vth, mobility) of the thin film transistor from each pixel and by appropriately correcting input data in accordance with the sensing result.

Among the image quality compensation techniques, an internal compensation method controls a pixel structure and a drive timing to exclude non-uniformity of the electrical characteristics of the thin film transistor while the organic light emitting diode emits light. The internal compensation method basically performs a sampling operation of saturating the thin film transistor to a certain level by increasing a gate voltage of the thin film transistor in a source follower manner.

In the trend of high-resolution and high-speed driving of the organic light emitting display device, a driving circuit for driving a pixel is also becoming more complex. In the case of a gate in panel (GIP) model in which the driving circuit is built in a display panel, the more complex the driving circuit becomes, the more a bezel area that is a non-display area, increases. Therefore, an obstacle occurs in forming a slim bezel.

SUMMARY

The purpose of the present disclosure is to form a slim bezel of the display device by simplifying the driving of the pixel circuit and by reducing the complexity of the driving circuit.

As a means for accomplishing the above-described purpose, the present disclosure has embodiments having the following features.

In one embodiment, a pixel circuit comprises: a driving transistor including a first electrode connected to a first node, a gate electrode connected to a second node, and a second electrode connected to a third node, the driving transistor configured to supply a driving current to a light emitting device; a first transistor that is electrically connected between the second node and the third node; a second transistor that is electrically connected between the first node and a data line that supplies a data voltage; a third transistor that is electrically connected between the first node and a power line that supplies a high potential voltage; and a storage capacitor which comprises a first electrode and a second electrode, the first electrode of the storage capacitor connected to the power line that supplies the high potential voltage and the second electrode of the storage capacitor connected to the second node.

In one embodiment, a display device comprises: a display panel including a plurality of pixels that are arranged in an area formed by a plurality of gate lines and a plurality of data lines that cross each other; a gate driving circuit configured to output a gate signal to a pixel from the plurality of pixels; and a data driving circuit configured to output a data voltage to the pixel, wherein the pixel comprises a pixel circuit including: a driving transistor including a first electrode connected to a first node, a gate electrode connected to a second node, and a second electrode connected to a third node, the driving transistor configured to supply a driving current to a light emitting device; a first transistor that is electrically connected between the second node and the third node; a second transistor that is electrically connected between the first node and a data line from the plurality of data lines that supplies a data voltage; a third transistor that is electrically connected between the first node and a power line that supplies a high potential voltage; and a storage capacitor that comprises a first electrode and a second electrode, the first electrode of the storage capacitor connected to the power line that supplies the high potential voltage and the second electrode of the storage capacitor connected to the second node.

In one embodiment, a display device comprises: a display panel including a plurality of pixels that are arranged in a plurality of pixel rows, a plurality of gate lines connected to the plurality of pixels, and a plurality of data lines connected to the plurality of pixels, the plurality of pixel rows including a first pixel row and a second pixel row that is after the first pixel row, wherein at least one pixel row is between the first pixel row and the second pixel row; a gate driving circuit configured to output a plurality of gate signals to the plurality of pixels; and a data driving circuit configured to output a plurality of data voltages to the plurality of pixels, wherein a pixel included in the second pixel row includes: a driving transistor including a first electrode connected to a first node, a gate electrode connected to a second node, and a second electrode connected to a third node, the driving transistor configured to supply a driving current to a light emitting device; a first transistor that is electrically connected between the second node and the third node; a second transistor that is electrically connected between the first node and a data line from the plurality of data lines that supplies a data voltage from the plurality of data voltages; a third transistor that is electrically connected between the first node and a power line that supplies a high potential voltage; a storage capacitor that comprises a first electrode and a second electrode, the first electrode of the storage capacitor connected to the power line that supplies the high potential voltage and the second electrode of the storage capacitor connected to the second node; and a fourth transistor that is electrically connected between the second node and a voltage line that provides an initialization voltage, wherein the fourth transistor is configured to supply the initialization voltage to the gate electrode of the driving transistor at the second node responsive to a first scan signal that is also supplied to a pixel included in the first pixel row.

The driving of the pixel circuit according to the embodiment of the present disclosure is simple, so that the complexity of the driving circuit can be reduced and furthermore a slim bezel of the display device can be achieved.

BRIEF DESCRIPTION OF THE DRAWINGS

Each of FIG. 2A

DETAILED DESCRIPTION

Figure 1:
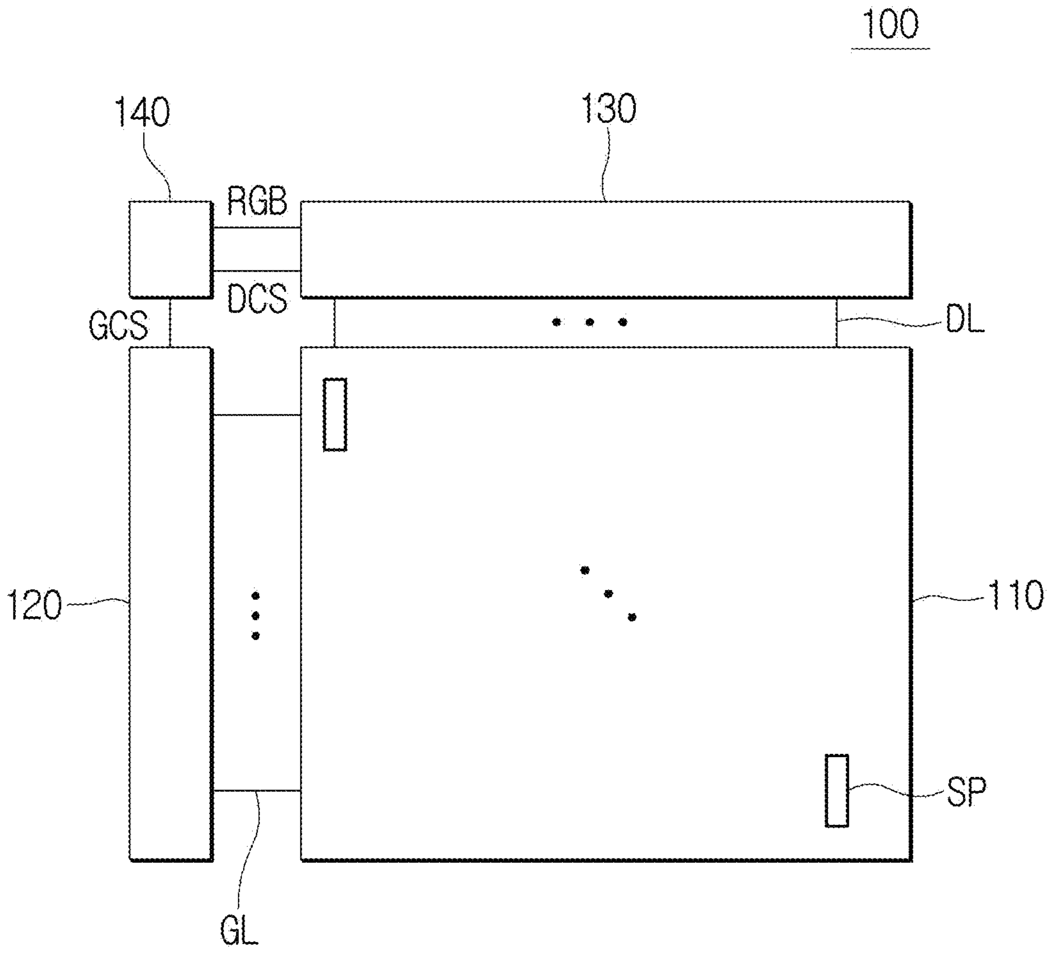
FIG. 1 shows a schematic configuration of a display device according to embodiments of the present disclosure.

Since the shapes, sizes, proportions, angles, numbers, etc., disclosed in the drawings for describing the embodiments of the present invention are illustrative, the present invention is not limited to the shown details. The same reference numerals throughout the disclosure correspond to the same elements. Also, throughout the description of the present invention, the detailed description of known technologies incorporated herein will be omitted when it may make the subject matter of the present invention unclear. When terms such as "includes", "has", "composed", etc., mentioned in the present disclosure are used, other parts can be added unless a term "only" is used. A component represented in a singular form includes the expression of plural form thereof unless otherwise explicitly mentioned.

In construing components, error ranges are construed as being included unless otherwise explicitly mentioned.

In describing positional relationships, when the positional relationship of two parts is described, for example, "on", "over", "under", "next to", etc., one or more other parts may be positioned between the two parts as long as a term "directly" or "immediately" is not used.

While terms such as the first and the second, etc., can be used to describe various components, the components are not limited by the terms mentioned above. The terms are used only for distinguishing between one component and other components. Therefore, the first component to be described below may be the second component within the spirit of the present invention.

The same reference numerals throughout the disclosure correspond to the same elements.

Hereinafter, various embodiments of the present invention will be described in detail with reference to the accompanying drawings. The component names used in the following description are selected in consideration of making it easier to write the specification and may be different from the component names of an actual product.

FIG. 1 shows a schematic configuration of a display device according to embodiments of the present disclosure.

Referring to FIG. 1, the display device 100 according to embodiments of the present disclosure may include a display panel 110 in which a plurality of sub-pixels SP are arranged, a gate driving circuit 120 for driving the display panel 110, a data driving circuit 130, and a controller 140.

In the display panel 110, a plurality of gate lines GL and a plurality of data lines DL are disposed, and a sub-pixel SP is disposed in a region defined by the intersection of the gate line GL and the data line DL.

The gate driving circuit 120 is controlled by the controller 140. The gate driving circuit 120 sequentially outputs scan signals to the plurality of gate lines GL disposed on the display panel 110 and controls a drive timing of the plurality of sub-pixels SP.

In some cases, the gate driving circuit 120 may output a scan signal for controlling the drive timing of the sub-pixel SP and a light emission control signal for controlling a light emission timing of the sub-pixel SP. In this case, a circuit for outputting the scan signal and a circuit for outputting the light emission control signal may be implemented as separate circuits or as a single circuit.

The gate driving circuit 120 may include one or more gate driver integrated circuits (GDIC) and may be located only on one side or both sides of the display panel 110 depending on a driving method thereof.

Each gate driver integrated circuit (GDIC) may be connected to bonding pad of the display panel 110 by a tape automated bonding (TAB) method, a chip on glass (COG) method, or a chip on polyimide (COP) method or may be implemented in a gate in panel (GIP) type and disposed directly on the display panel 110. In some cases, each gate driver integrated circuit may be integrated and disposed on the display panel 110. In addition, each gate driver integrated circuit (GDIC) may be implemented by a chip on film (COF) method in which the GDIC is mounted on a film connected to the display panel 110.

The data driving circuit 130 receives image data from the controller 140 and converts the image data into a data voltage in analog form. Also, the data voltage is output to each data line DL in accordance with a timing at which the scan signal is applied through the gate line GL, so that each sub-pixel SP represents brightness according to the image data.

The data driving circuit 130 may include one or more source driver integrated circuits (SDIC).

Each source driver integrated circuit (SDIC) may include a shift register, a latch circuit, a digital to analog converter (DAC), an output buffer, and the like.

Each source driver integrated circuit (SDIC) may be connected to a bonding pad of the display panel 110 by the tape automated bonding (TAB) method, the chip on glass (COG) method, or the chip on polyimide (COP) method, or may be directly disposed on the display panel 110, or, in some cases, may be integrated and disposed on the display panel 110. Also, each source driver integrated circuit (SDIC) may be implemented in a chip on film (COF) method. In this case, each source driver integrated circuit (SDIC) may be mounted on a film connected to the display panel 110 and may be electrically connected to the display panel 110 through wires on the film.

The controller 140 supplies various control signals to the gate driving circuit 120 and the data driving circuit 130 and controls operations of the gate driving circuit 120 and the data driving circuit 130.

The controller 140 may be mounted on a printed circuit board, a flexible printed circuit, etc., and may be electrically connected to the gate driving circuit 120 and the data driving circuit 130 through the printed circuit board, the flexible printed circuit, etc.

The controller 140 causes the gate driving circuit 120 to output a scan signal according to a timing generated in each frame, converts an image data received from the outside in accordance with a data signal format used by the data driving circuit 130, and outputs the converted image data to the data driving circuit 130.

The controller 140 receives, together with the image data, various timing signals including a vertical synchronization signal, a horizontal synchronization signal, an input data enable signal, and a clock signal from the outside (e.g., a host system).

The controller 140 may generate various control signals by using various timing signals received from the outside and may output them to the gate driving circuit 120 and the data driving circuit 130.

For example, in order to control the gate driving circuit 120, the controller 140 outputs various gate control signals (GCS) including a gate start pulse (GSP), a gate shift clock (GSC), a gate output enable signal (GOE), etc.

Here, the gate start pulse (GSP) controls an operation start timing of one or more gate driver integrated circuits (GDIC) which constitutes the gate driving circuit 120. The gate shift clock (GSC) is a clock signal which is commonly input to one or more gate driver integrated circuits (GDIC). The gate shift clock (GSC) controls a shift timing of the scan signal. The gate output enable signal (GOE) designates timing information of one or more gate driver integrated circuits (GDIC).

Also, in order to control the data driving circuit 130, the controller 140 outputs various data control signals (DCS) including a source start pulse (SSP), a source sampling clock (SSC), a source output enable signal (SOE), etc.

Here, the source start pulse (SSP) controls a data sampling start timing of one or more source driver integrated circuits (SDIC) which constitutes the data driving circuit 130. The source sampling clock (SSC) is a clock signal which controls a sampling timing of data in each of the source driver integrated circuits (SDIC). The source output enable signal (SOE) controls an output timing of the data driving circuit 130.

The display device may further include a power management integrated circuit (not shown) which supplies various voltages or currents to the display panel 110, the gate driving circuit 120, the data driving circuit 130, etc., or controls various voltages or currents to be supplied.

Each subpixel SP may be defined by the intersection of the gate line GL and the data line DL, and a liquid crystal or a light emitting device EL may be disposed depending on the type of the display device.

The light emitting device EL may be composed of an organic light emitting diode. The organic light emitting diode includes an anode electrode, a cathode electrode, and an organic compound layer (HIL, HTL, EML, ETL, and EIL) formed between the anode electrode and the cathode electrode. The organic compound layer includes a hole injection layer (HIL), a hole transport layer (HTL), an emitting material layer (EML), an electron transport layer (ETL), and an electron injection layer (EIL). When a driving voltage is applied to the anode electrode and the cathode electrode, the holes that have passed through the hole transport layer (HTL) and electrons that have passed through the electron transport layer (ETL) move to the emitting material layer (EML) and form excitons, and as a result, the emitting material layer (EML) produces visible light.

Figure 2A:
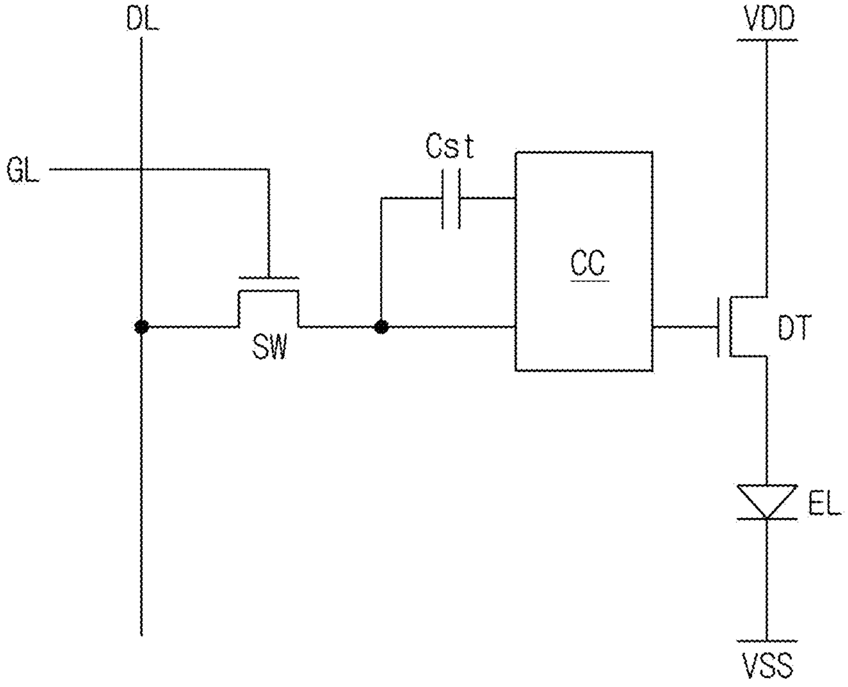
FIG. 2B is a view showing an example of a sub-pixel structure according to the embodiment of the present disclosure.
Figure 2B:
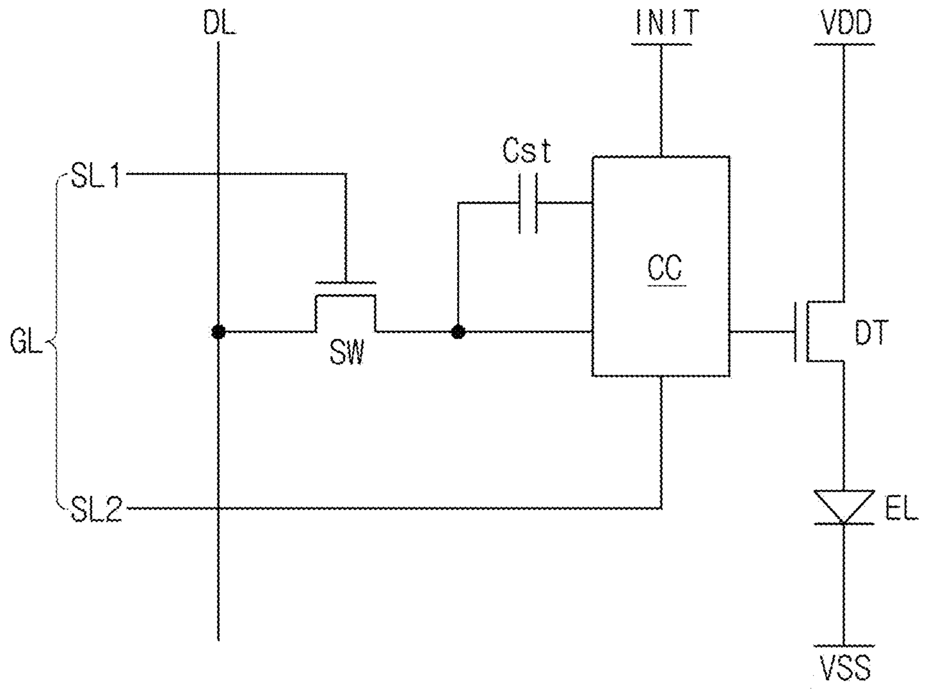

Each of FIGS. 2A and 2B is a view showing an example of a sub-pixel structure according to the embodiment of the present disclosure.

Referring to FIG. 2A, one subpixel includes a switching transistor SW, a driving transistor DT, a compensation circuit CC, and an organic light emitting diode EL. The organic light emitting diode EL operates to emit light in accordance with a driving current generated by the driving transistor DT. The switching transistor SW and the driving transistor DT are three-terminal elements and include a source electrode, a drain electrode, and a gate electrode. Hereinafter, the source electrode will be described as a first electrode and the drain electrode will be described as a second electrode.

The switching transistor SW performs a switching operation such that a data signal supplied through the data line DL in response to a gate signal supplied through the gate line GL is stored as a data voltage in a capacitor Cst. The driving transistor DT operates such that the driving current flows between a high potential power supply voltage VDD and a low potential power supply voltage VSS in accordance with the data voltage stored in the capacitor Cst. The compensation circuit CC is for compensating a threshold voltage Vth of the driving transistor DT, etc. Meanwhile, according to various embodiments, the capacitor Cst connected to the switching transistor SW or the driving transistor DT may be located within the compensation circuit CC.

The compensation circuit CC is composed of one or more thin film transistors and a capacitor. The compensation circuit CC may be configured in a wide variety of ways according to a compensation method.

Also, as shown in FIG. 2B, when the compensation circuit CC is included, the subpixel may further include a signal line, a power line, etc., which are for driving a compensation thin film transistor and for supplying a specific signal or electric power.

Figure 3:
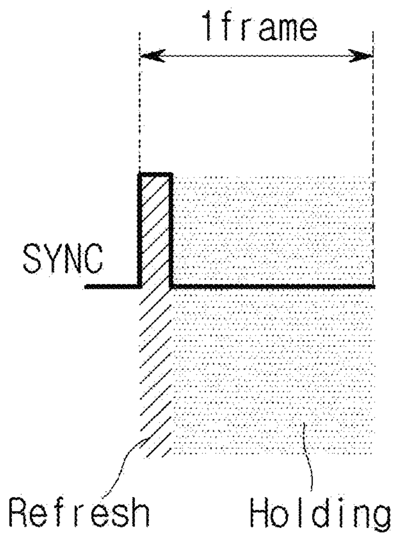
FIG. 3 shows an example of drive timing of the sub-pixel shown in FIGS. 2A and 2B.

FIG. 3 shows an example of the drive timing of the sub-pixel shown in FIGS. 2A and 2B.

One frame period for displaying an image may be divided into a refresh period and a holding period in accordance with a synchronization signal SYNC.

The display device according to the embodiment may operate in a low-speed driving mode and a high-speed driving mode. In the low-speed driving mode, the display device controls the holding period to be longer for a unit time and controls one-frame period to be longer. When the display device operates at a low speed, power consumption can be reduced. In the high-speed driving mode, the display device controls the holding period to be shorter for a unit time and controls the one-frame period to be shorter in comparison to the low-speed driving mode. The high-speed driving can smoothly represent high-speed images with large image changes.

The refresh period may be subdivided into an initialization period, a sampling period, a programming period, and a light emission period.

During the initialization period, the data voltage written to the light emitting device EL is initialized by applying an initialization voltage to the subpixel SP. During the sampling period, the threshold voltage Vth of the driving transistor is stored in the capacitor connected to the driving transistor. During the programming period, the data voltage is applied to the subpixel SP, and thus, the data voltage is stored in the capacitor connected to the driving transistor.

The sampling period and the programming period are conceptually distinguished. The sampling period and the programming period are separated from each other according to the subpixel structure so that the operations in the periods may be sequentially performed or may be performed at the same time. In the subpixel structure described in the embodiment of the present disclosure, the operations in the sampling period and the operations in the programming period may be performed simultaneously.

During the holding period, the data voltage is not supplied through the data lines connected to the light emitting devices EL, respectively, and the light emitting devices emit light by using the data voltage stored in a refresh frame as it is. Thus, the previously programmed data voltage is maintained during the holding period.

Comparison Example

FIGS. 4 to 7 show comparison examples to be compared with the present disclosure.

Figure 4:
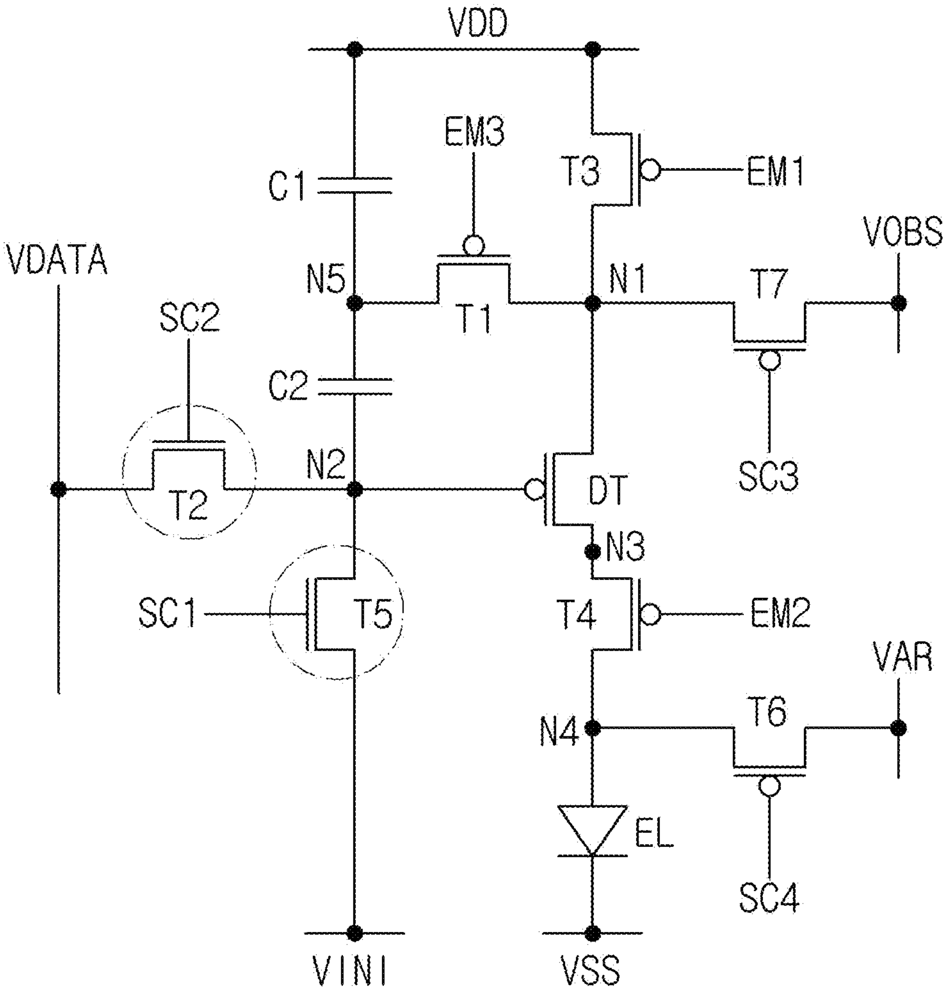
FIG. 4 is a circuit diagram of the sub-pixel according to a comparison example.
Figure 5:
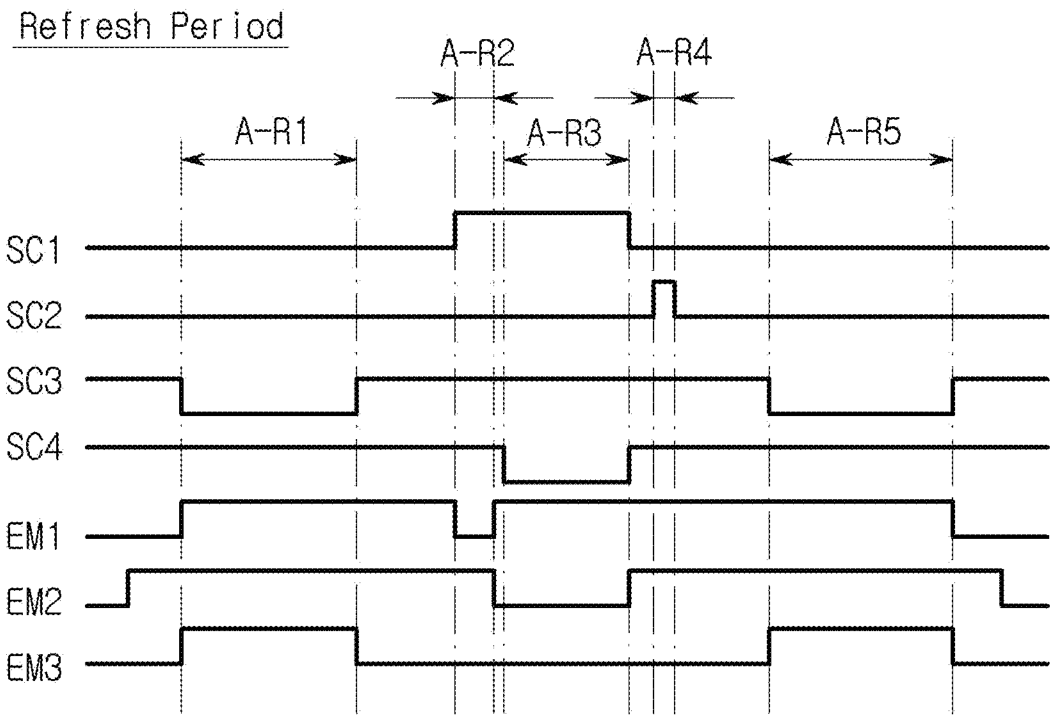
FIG. 5 is a drive timing diagram in a refresh period according to the comparison example.
Figure 6:
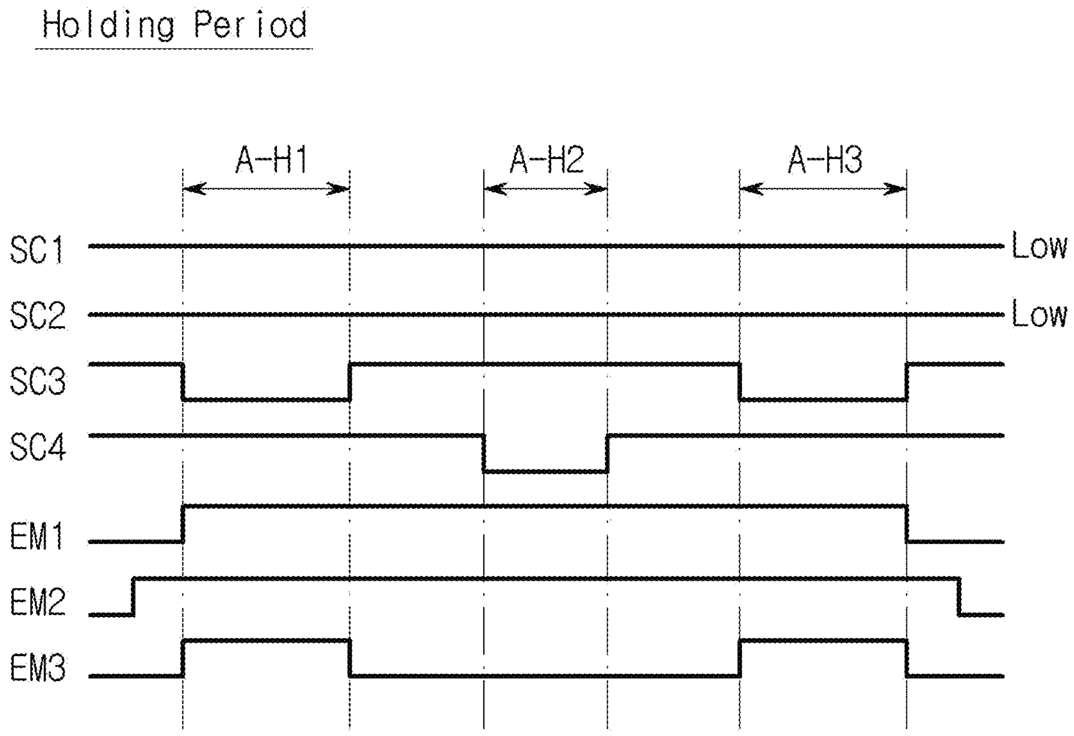
FIG. 6 is a drive timing diagram in a holding period according to the comparison example.
Figure 7:
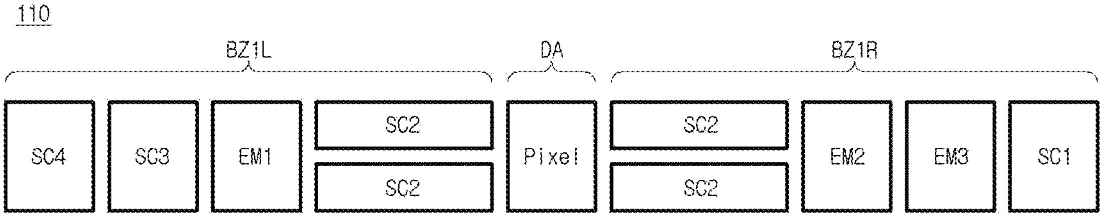
FIG. 7 is a view for describing a bezel area of a display panel according to the comparison example.

FIG. 4 is a circuit diagram of the sub-pixel according to a comparison example. FIG. 5 is a drive timing diagram in the refresh period according to the comparison example. FIG. 6 is a drive timing diagram in the holding period according to the comparison example. FIG. 7 is a view for describing a bezel area of the display panel according to the comparison example.

A pixel circuit according to the comparison example includes eight transistors and two capacitors.

The driving transistor DT supplies the driving current to the light emitting device EL. The driving transistor DT includes a first electrode connected to a first node N1, a gate electrode connected to a second node N2, and a second electrode connected to a third node N3.

A first transistor T1 includes a first electrode connected to a fifth node N5, a second electrode connected to the first node N1, and a gate electrode connected to a third light emission control signal EM3. When the third light emission control signal EM3 is low, the first transistor T1 is turned on and electrically connects the first node N1 and the fifth node N5.

A second transistor T2 includes a first electrode connected to the second node N2, a second electrode connected to a data line that supplies a data voltage VDATA, and a gate electrode connected to a second scan signal SC2. When the second scan signal SC2 is high, the second transistor T2 is turned on and supplies the data voltage VDATA to the second node N2.

A third transistor T3 includes a first electrode connected to a power line that supplies the high potential power supply voltage VDD, a second electrode connected to the first node N1, a gate electrode connected to a first light emission control signal EM1. When the first light emission control signal EM1 is low, the third transistor T3 is turned on and supplies the high potential power supply voltage VDD to the first node N1.

A fourth transistor T4 includes a first electrode connected to the third node N3, a second electrode connected to a fourth node N4, and a gate electrode connected to a second light emission control signal EM2. When the second emission control signal EM2 is low, the fourth transistor is turned on and electrically connects the third node N3 and the fourth node N4.

A fifth transistor T5 includes a first electrode connected to the second node N2, a second electrode connected to the initialization voltage VINI, and a gate electrode connected to a first scan signal SC1. When the first scan signal SC1 is high, the fifth transistor T5 is turned on and supplies the initialization voltage VINI to the second node N2.

A sixth transistor T6 includes a first electrode connected to an anode reset voltage VAR, a second electrode connected to the fourth node N4, and a gate electrode connected to a fourth scan signal SC4. When the fourth scan signal SC4 is low, the sixth transistor T6 is turned on and supplies the anode reset voltage VAR to the fourth node N4.

A seventh transistor T7 includes a first electrode connected to a bias voltage VOBS, a second electrode connected to the first node N1, and a gate electrode connected to a third scan signal SC3. When the third scan signal SC3 is low, the seventh transistor T7 is turned on and supplies the bias voltage VOBS to the first node N1.

The light emitting device EL includes an anode electrode connected to the fourth node N4 and a cathode electrode connected to the low potential power supply voltage VSS. The light emitting device EL receives a driving current from the driving transistor DT and emits light.

A first capacitor C1 is connected between the high potential power supply voltage VDD and the fifth node N5.

A second capacitor C2 is connected between the fifth node N5 and the second node N2. The second capacitor C2 functions as a storage capacitor for maintaining a voltage signal in the pixel.

The second and fifth transistors T2 and T5 may be composed of an oxide semiconductor transistor which uses an oxide semiconductor material as an active layer.

The driving in the refresh period of the comparison example will be described with reference to FIG. 5.

Table 1 shows switching operations of the first to seventh transistors T1 to T7 in first to fifth periods A-R1 to A-R5. In the table 1 below, ON represents that a corresponding transistor is turned on, whereas OFF represents that a corresponding transistor is turned OFF.

TABLE 1

| | T1 | T2 | T3 | T4 | T5 | T6 | T7 |
|---|---|---|---|---|---|---|---|
| A-R1 | OFF | OFF | OFF | OFF | OFF | OFF | ON |
| A-R2 | ON | OFF | ON | OFF | ON | OFF | OFF |
| A-R3 | ON | OFF | OFF | ON | ON | ON | OFF |
| A-R4 | ON | ON | OFF | OFF | OFF | OFF | OFF |
| A-R5 | OFF | OFF | OFF | OFF | OFF | OFF | ON |

In the first and fifth periods A-R1 and A-R5, the seventh transistor T7 is turned on and the bias voltage VOBS is applied to the first node N1 and all remaining transistors are turned off. The first and fifth periods A-R1 and A-R5 are periods in which a hysteresis of the driving transistor DT is reduced by directly applying the bias voltage VOBS to the driving transistor DT.

The second period A-R2 is an initialization period in which the first, third, and fifth transistors T1, T3, and T5 are turned on and a voltage corresponding to a difference between the initialization voltage VINI and the high potential power supply voltage VDD is stored in the second capacitor C2. All other remaining transistors are turned off during the second period A-R2.

The third period A-R3 is a sampling period in which the first, fourth, fifth, and sixth transistors T1, T4, T5, and T6 are turned on and the threshold voltage Vth of the driving transistor DT is sampled. Also, in the third period A-R3, the sixth transistor T6 is turned on and the anode reset voltage VAR is applied to the fourth node N4, so that the anode electrode of the light emitting device EL connected to the fourth node N4 is reset to the anode reset voltage VAR.

The fourth period A-R4 is a programming period in which the first and second transistors T1 and T2 are turned on and the data voltage VDATA is supplied to the second node N2. All other remaining transistors are turned off during the fourth period A-R4.

The driving of the holding period of the comparison example will be described with reference to FIG. 6.

Table 2 shows the switching operations of the first to seventh transistors T1 to T7 in first to third periods A-H1 to A-H3.

TABLE 2

| | T1 | T2 | T3 | T4 | T5 | T6 | T7 |
|---|---|---|---|---|---|---|---|
| A-H1 | OFF | OFF | OFF | OFF | OFF | OFF | ON |
| A-H2 | ON | OFF | ON | ON | OFF | ON | OFF |
| A-H3 | OFF | OFF | OFF | OFF | OFF | OFF | ON |

In the first and third periods A-H1 and A-H3, the seventh transistor T7 is turned on and the bias voltage VOBS is applied to the first node N1 and all other remaining transistors are turned off during the first and third periods A-H1 and A-H3. The first and third periods A-H1 and A-H3 are periods in which the hysteresis of the driving transistor DT is reduced by directly applying the bias voltage VOBS to the driving transistor DT.

In the second period A-H2, the first, third, fourth, and sixth transistors T1, T3, T4, and T6 are turned on and all remaining transistors are turned off. The second period A-H2 is a period for resetting an anode electrode voltage of the light emitting device EL. Since the sixth transistor T6 is turned on in the second period, the anode reset voltage VAR is applied to the fourth node N4, and the anode electrode of the light emitting device EL connected to the fourth node N4 is reset to the anode reset voltage VAR.

As such, the pixel circuit according to the comparison example may operate by a variable refresh rate (VRR) driving method in which a driving frequency is varied according to a display image.

FIG. 7 is a view for describing a bezel area of the display panel according to the comparison example.

The display panel 110 may be divided into a display area DA in which pixels are disposed and a bezel area in which the GIP driving circuit is disposed. The GIP driving circuit may be disposed on both left and right edges of the display panel 110, and the pixel circuit may be disposed at the center of the display panel 110. That is, the bezel area may be located on both left and right sides of the display panel 110, and the display area DA may be located at the center of the display panel 110.

The pixel circuit according to the comparison example requires various control signals such as the first to fourth scan signals SC1 to SC4, the first to third light emission control signals EM1 to EM3, etc., in order to control the first to seventh transistors T1 to T7. Therefore, the driving circuit for driving the pixel circuit according to the comparison example is complex.

As shown in FIG. 7, the GIP driving circuit includes seven stages, in order to supply the first to fourth scan signals SC1 to SC4 and the first to third light emission control signals EM1 to EM3 to the pixel circuit. A plurality of the stages constituting the GIP driving circuit may be disposed in a left bezel area BZ1L and a right bezel area BZ1R. The stage for supplying the second scan signal SC2 may be disposed in the left bezel area BZ1L and the right bezel area BZ1R of the display panel 110 respectively so as to supply the second scan signal SC2 in a double-feeding manner.

In the display device including the pixel circuit of the comparison example, in the case of the GIP (gate in panel) model in which the driving circuit is built in the display panel 110, the bezel area increases, and thus, it is difficult to form a slim bezel.

EMBODIMENT OF THE PRESENT DISCLOSURE

Figure 8:
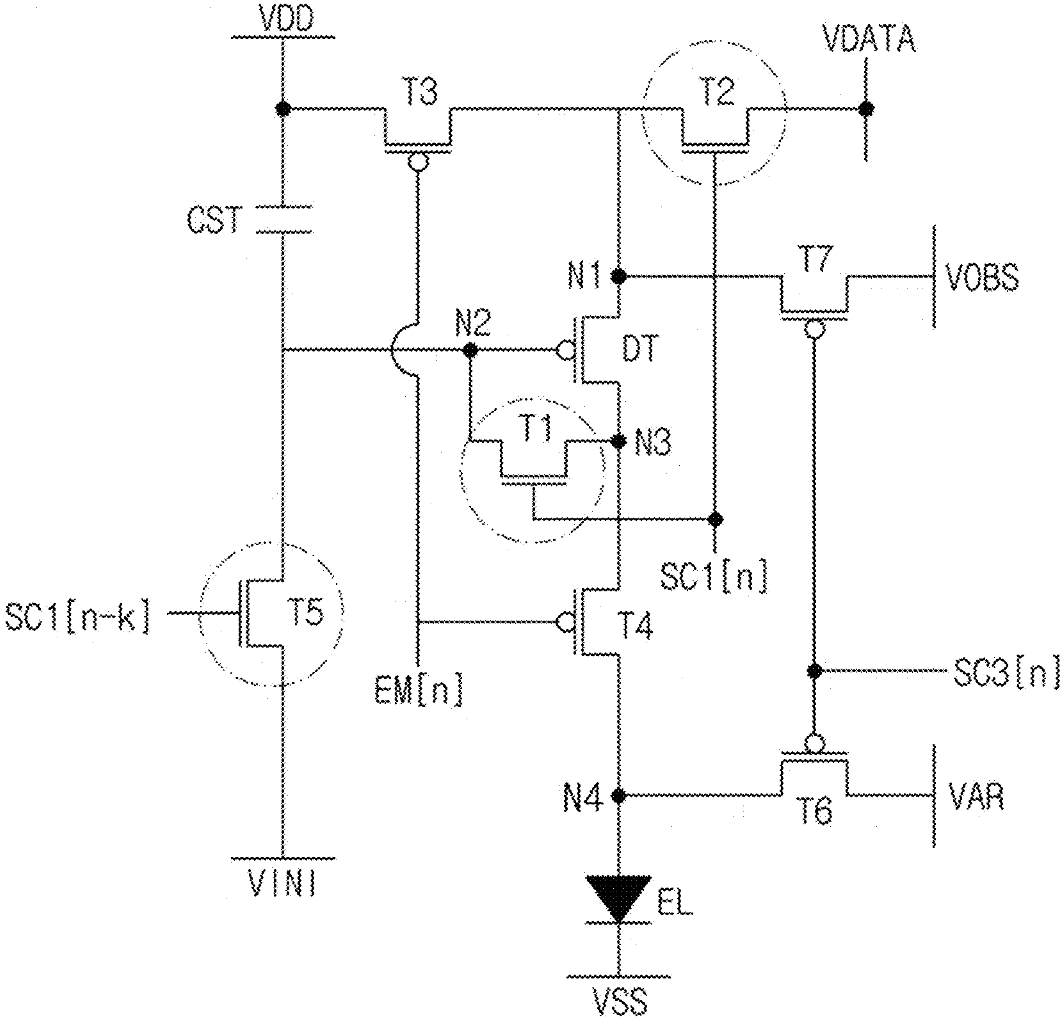
FIG. 8 is a circuit diagram of the sub-pixel according to an embodiment of the present disclosure.
Figure 9:
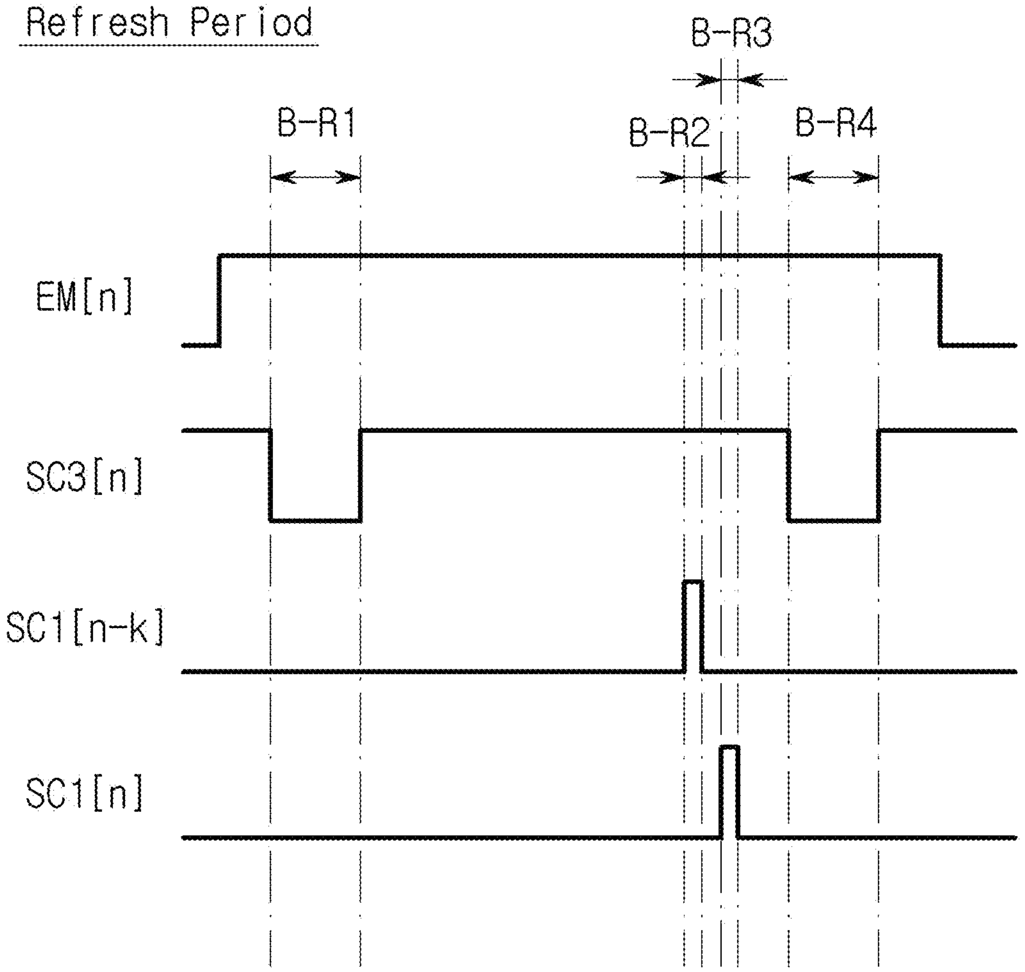
FIG. 9 is a drive timing diagram in the refresh period according to an embodiment of the present disclosure.
Figure 10:
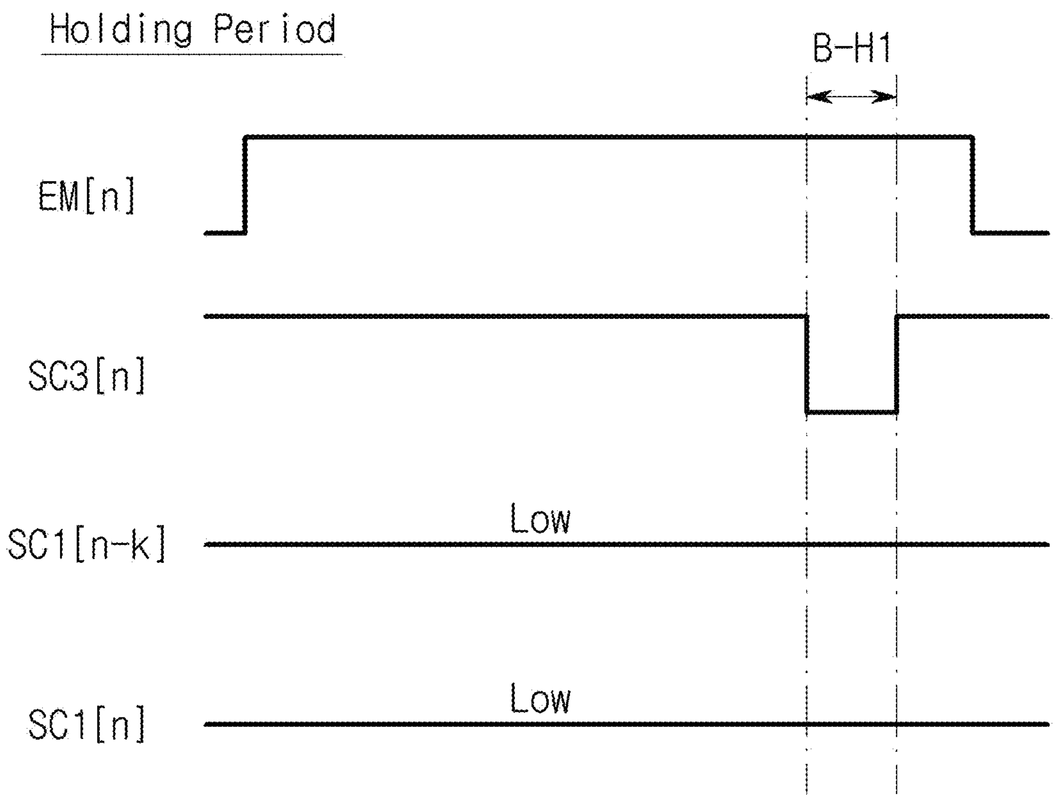
FIG. 10 is a drive timing diagram in the holding period according to an embodiment of the present disclosure.
Figure 11:
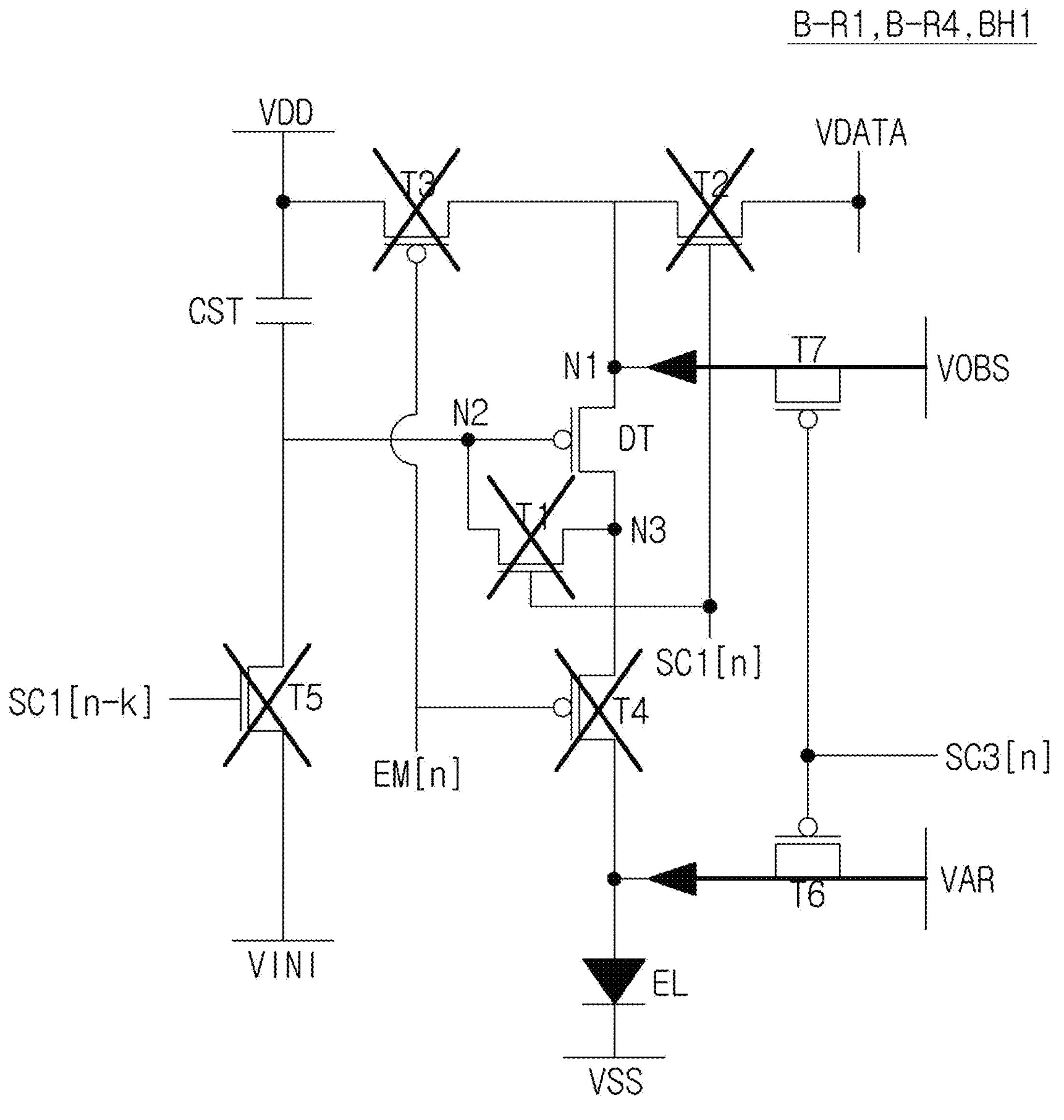
FIG. 11 shows operation states of a first period and a fourth period of the refresh period and of a first period of the holding period of the pixel circuit according to an embodiment of the present disclosure.
Figure 12:
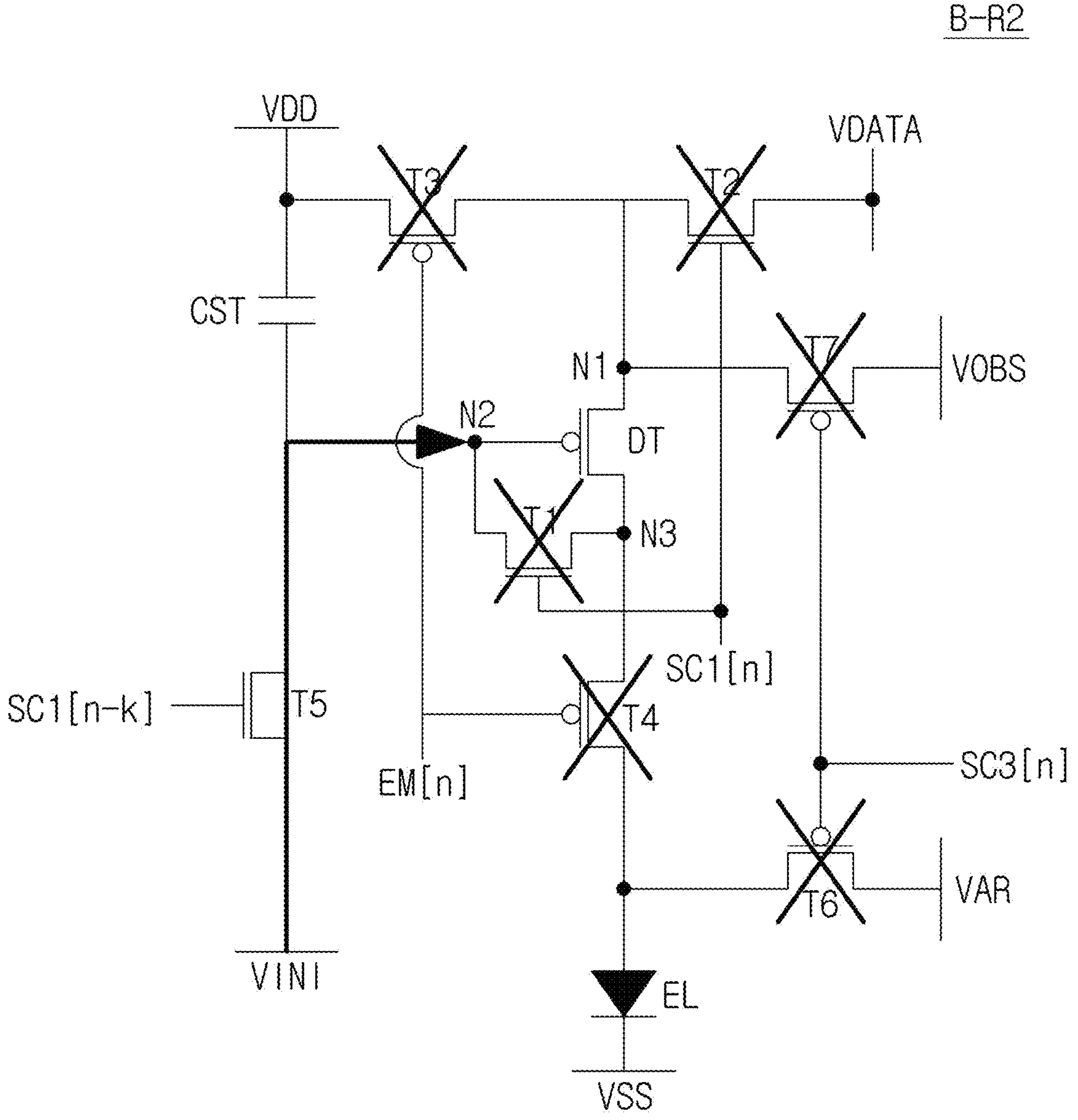
FIG. 12 shows an operation state of a second period of the refresh period of the pixel circuit according to an embodiment of the present disclosure.
Figure 13:
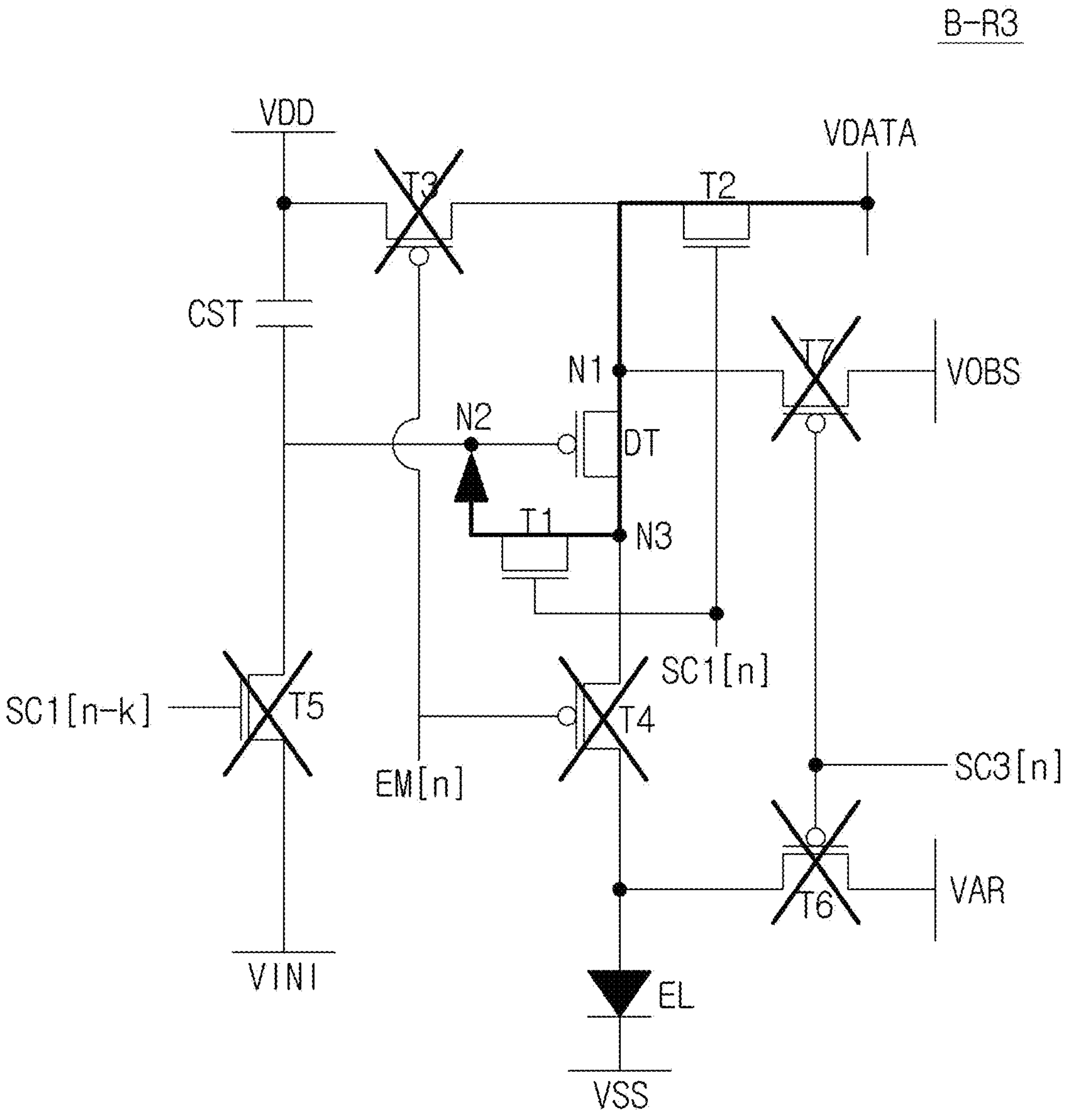
FIG. 13 shows an operation state of a third period of the refresh period of the pixel circuit according to an embodiment of the present disclosure.
Figure 14:
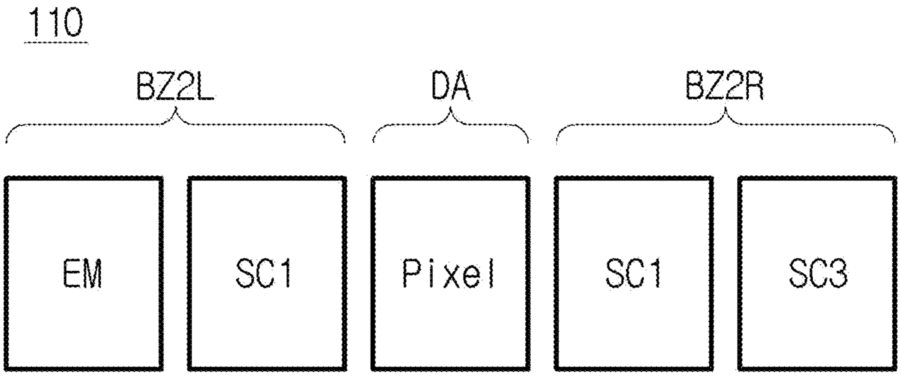
FIG. 14 is a view for describing the bezel area of the display panel according to an embodiment of the present disclosure.

FIG. 8 is a circuit diagram of the sub-pixel according to an embodiment of the present disclosure. FIG. 9 is a drive timing diagram in the refresh period according to the embodiment of the present disclosure. FIG. 10 is a drive timing diagram in the holding period according to the embodiment of the present disclosure. FIG. 11 shows operation states of a first period and a fourth period of the refresh period and of a first period of the holding period of the pixel circuit according to the embodiment of the present disclosure. FIG. 12 shows an operation state of a second period of the refresh period of the pixel circuit according to the embodiment of the present disclosure. FIG. 13 shows an operation state of a third period of the refresh period of the pixel circuit according to the embodiment of the present disclosure. FIG. 14 is a view for describing the bezel area of the display panel according to the embodiment of the present disclosure.

The display device according to the embodiment of the present disclosure includes the pixel circuit in which the switching TFT is formed of an oxide semiconductor TFT and the driving TFT is formed of a LTPS (low temperature polycrystalline silicon) TFT. However, in the display device of the present disclosure, the switching TFT is not limited to the oxide semiconductor TFT, and the driving TFT is not limited to the LTPS TFT. Also, they may be variously formed of a multi-type TFT. Also, in the display device, the pixel circuit may include one type of a TFT instead of the multi-type TFTs.

Since the oxide semiconductor material has a low off-current, it may be suitable for the switching TFT that has a short turn-on time and maintain a long turn-off time. The oxide semiconductor TFT has a better voltage holding characteristic than that of the LTPS TFT.

First, a circuit diagram of the sub-pixel according to the embodiment of the present disclosure will be described with reference to FIG. 8. The pixel circuit shown in FIG. 8 is a pixel circuit arranged in an n-th row among a plurality of the pixel circuits arranged in the form of a matrix on the display panel 110.

The pixel circuit according to the embodiment includes eight transistors and one capacitor. A first transistor T1, a second transistor T2, and a fifth transistor T5 may be composed of the oxide semiconductor transistor which uses an oxide semiconductor material as an active layer in one embodiment.

In the pixel circuit arranged in the n-th row shown in FIG. 8, the fifth transistor T5 among the first to seventh transistors T1 to T7 receives a scan signal SC from the gate line of an (n-k)-th row (k is a natural number less than n). Thus, the fifth transistor T5 receives a scan signal SC from the gate line of another row of pixel circuits. The other transistors T1 to T4 and T6 to T7 receive the scan signal SC and the light emission control signal EM from the gate line of the n-th row. In other words, the gate line of the (n)-th row supplies the scan signal SC and the light emission control signal EM to the first to fourth and sixth to seventh transistors T1 to T4 and T6 to T7 constituting the pixel circuit arranged in the (n)-th row, and the gate line of the (n-k)-th row supplies the scan signal to the fifth transistor T5 constituting the pixel circuit arranged in the n-th row.

The driving transistor DT supplies a driving current to the light emitting device EL. The driving transistor DT includes the first electrode connected to the first node N1, the gate electrode connected to the second node N2, and the second electrode connected to the third node N3.

The first transistor T1 includes a first electrode connected to the second node N2, a second electrode connected to the third node N3, and a gate electrode connected to the first scan signal SC1. The first transistor T1 is turned on when the first scan signal SC1 is high to electrically connect the second node N2 and the third node N3.

The second transistor T2 includes a first electrode connected to the first node N1, a second electrode connected to a data line that supplies the data voltage VDATA, and a gate electrode connected to the first scan signal SC1. When the first scan signal SC1 is high, the second transistor T2 is turned on and supplies the data voltage VDATA to the first node N1.

The third transistor T3 includes a first electrode connected to a power line that supplies the high potential power supply voltage VDD, a second electrode connected to the first node N1, and a gate electrode connected to the light emission control signal EM. When the light emission control signal EM is low, the third transistor T3 is turned on and supplies the high potential power supply voltage VDD to the first node N1.

The fourth transistor T4 includes a first electrode connected to the third node N3, a second electrode connected to the fourth node N4, and a gate electrode connected to the light emission control signal EM. When the light emission control signal EM is low, the fourth transistor T4 is turned on and electrically connects the third node N3 and the fourth node N4.

The fifth transistor T5 includes a first electrode connected to the second node N2, a second electrode connected to a voltage line that supplies the initialization voltage VINI, and a gate electrode connected to the first scan signal SC1. The first transistor T1 and the second transistor T2 receive the first scan signal SC1 from the gate line of the n-th row. Compared with this, the fifth transistor T5 receives the first scan signal SC1 from the gate line of the (n-k)-th row. When the first scan signal SC1 is high, the fifth transistor T5 is turned on and supplies the initialization voltage VINI to the second node N2.

The sixth transistor T6 includes a first electrode connected to a voltage line that supplies the anode reset voltage VAR, a second electrode connected to the fourth node N4, and a gate electrode connected to a third scan signal SC3. When the third scan signal SC3 is low, the sixth transistor T6 is turned on and supplies the anode reset voltage VAR to the fourth node N4.

The seventh transistor T7 includes a first electrode connected to a voltage line that supplies the bias voltage VOBS, a second electrode connected to the first node N1, and a gate electrode connected to the third scan signal SC3. When the third scan signal SC3 is low, the seventh transistor T7 is turned on and supplies the bias voltage VOBS to the first node N1.

The light emitting device EL includes an anode electrode connected to the fourth node N4 and a cathode electrode connected to the low potential power supply voltage VSS. The light emitting device EL receives a driving current from the driving transistor DT and emits light.

The storage capacitor CST is connected between the high potential supply voltage and the second node N2. The storage capacitor CST maintains a data voltage VDATA signal in the pixel.

The driving of the refresh period of the embodiment will be described with reference to FIG. 9.

Table 3 shows switching operations of the first to seventh transistors T1 to T7 in first to fourth periods B-R1 to B-R4.

TABLE 3

| | T1 | T2 | T3 | T4 | T5 | T6 | T7 |
|---|---|---|---|---|---|---|---|
| B-R1 | OFF | OFF | OFF | OFF | OFF | ON | ON |
| B-R2 | OFF | OFF | OFF | OFF | ON | OFF | OFF |
| B-R3 | ON | ON | OFF | OFF | OFF | OFF | OFF |
| B-R4 | OFF | OFF | OFF | OFF | OFF | ON | ON |

In the first and fourth periods B-R1 and B-R4, only the sixth transistor T6 and the seventh transistor T7 are turned on and all remaining transistors are turned off. The bias voltage VOBS is applied to the first node N1, and the anode reset voltage VAR is applied to the fourth node N4. The first and fourth periods B-R1 and B-R4 are periods in which a hysteresis of the driving transistor DT is reduced by directly applying the bias voltage VOBS to the driving transistor DT. Also, the first and fourth periods B-R1 and B-R4 are periods in which the anode electrode of the light emitting device EL connected to the fourth node N4 is reset to the anode reset voltage VAR. The operation state of the pixel circuit in the first and fourth periods B-R1 and B-R4 is shown in FIG. 11.

The second period B-R2 is an initialization period. In the second period B-R2, only the fifth transistor T5 is turned on, the initialization voltage VINI is applied to the second node N2, and a voltage corresponding to a difference between the initialization voltage VINI and a high potential driving voltage is stored in the storage capacitor CST. All other remaining transistors are turned off during the second period B-R2. The operation state of the pixel circuit in the second period B-R2 is shown in FIG. 12.

The third period B-R3 is a programming period in which the first transistor T1 and the second transistor T2 are turned on. In the third period B-R3, the data voltage VDATA is applied to the first node N1, and a voltage obtained by subtracting the threshold voltage Vth of the driving transistor DT from the data voltage VDATA, that is to say, "VDATA-Vth" is applied to the second node N2. In the comparison example, sampling of the threshold voltage Vth of the driving transistor DT and programming of the data voltage VDATA have been performed separately in the third period A-R3 and in the fourth period A-R4. Compared with this, in the embodiment, the sampling of the threshold voltage of the driving transistor DT and the programming of the data voltage VDATA are simultaneously performed in the third period B-R3. The operation state of the pixel circuit of the embodiment in the third period B-R3 is shown in FIG. 13.

In one embodiment, a certain interval (e.g., a predetermined time interval) should be left between the second period B-R2 and the third period B-R3 such that circuit operations in the initialization period and programming period do not interfere with each other.

The second period B-R2 is a period in which the scan signal applied to the (n-k)-th row is high, and the third period B-R3 is a period in which the scan signal applied to the n-th row is high. The interval between the second period B-R2 and the third period B-R3 can be increased by increasing the value of k. In other words, the fifth transistor constituting the pixel circuit of the n-th row should receive the first scan signal from the gate line of the (n-k)-th row which is farther than the (n−1)-th row rather than should receive the first scan signal from the gate line of the (n−1)-th row which is an adjacent row. That is, the value of k is at least 2 in one embodiment.

Meanwhile, when a pixel is connected to a gate line located farther, an area occupied by a connecting wiring connecting the pixel and the gate line is increased. The increase of the area occupied by the connecting wiring reduces the aperture ratio of the display panel. This is not desirable. The inventors of the present disclosure have confirmed through collective consideration of these points that it is appropriate that the value of k is 2.

The driving in the holding period of the embodiment will be described with reference to FIG. 10.

Table 4 shows switching operations of the first to seventh transistors T1 to T7 in the first period.

TABLE 4

| | T1 | T2 | T3 | T4 | T5 | T6 | T7 |
|---|---|---|---|---|---|---|---|
| B-H1 | OFF | OFF | OFF | OFF | OFF | ON | ON |

In the first period B-H1, only the sixth transistor T6 and the seventh transistor T7 are turned on and all remaining transistors are turned off. The bias voltage VOBS is applied to the first node N1, and the anode reset voltage VAR is applied to the fourth node N4. The first period is a period in which the hysteresis of the driving transistor DT is reduced by directly applying the bias voltage VOBS to the driving transistor DT. Also, the first period is a period in which the anode electrode of the light emitting device EL connected to the fourth node N4 is reset to the anode reset voltage VAR. The operation of the pixel circuit in the first period B-H1 is, as shown in FIG. 11, the same as the operation of the pixel circuit in the first period B-R1 and the fifth period B-R5 of the refresh period.

As such, the pixel circuit according to the embodiment may operate by a variable refresh rate (VRR) driving method in which a driving frequency is varied according to a display image.

The pixel circuit according to the embodiment requires the first and third scan signals SC1 and SC3 and the light emission control signal EM in order to control the first to seventh transistors T1 to T7.

The pixel circuit of the comparative example described above requires at least seven control signals such as the first to fourth scan signals SC1 to SC4 and the first to third emission control signals EM1 to EM3. Compared with this, the pixel circuit according to the embodiment requires a total of three control signals, i.e., the first and third scan signals SC1 and SC3 and the light emission control signal EM. That is to say, it can be seen that the pixel circuit according to the embodiment requires less control signals than the pixel circuit according to the comparison example. Therefore, the driving circuit for driving the pixel circuit according to the embodiment is less complex than that of the comparison example.

FIG. 14 is a view for describing the bezel area of the display panel 110 according to the embodiment. The display panel 110 may be divided into a display area DA in which pixels are disposed and bezel areas BZ2L and BZ2R in which the GIP driving circuit is disposed. The GIP driving circuit may be disposed on both left and right edges of the display panel 110, and the pixel circuit may be disposed at the center of the display panel 110. That is, the bezel areas BZ2L and BZ2R may be respectively located on both left side (e.g., a first side) and a right side (e.g., a second side) of the display panel 110, and the display area DA may be located at the center of the display panel 110.

As shown in FIG. 14, the GIP driving circuit according to the embodiment includes three stages, in order to supply the first and third scan signals SC1 and SC3 and the light emission control signal EM to the pixel circuit. A plurality of stages constituting the GIP driving circuit may be disposed in the left bezel area BZ2L and the right bezel area BZ2R. The stage for supplying the first scan signal SC1 may be disposed in the left bezel area BZ2L and the right bezel area BZ2R of the display panel 110 respectively so as to supply the first scan signal SC1 in a double-feeding manner.

Through the comparison between the display panel 110 according to the embodiment and the display panel according to the comparison example of FIG. 7, it can be found that the bezel area BZ2L/BZ2R of FIG. 14 is reduced compared to the bezel area BZ1L/BZ1R of FIG. 7.

As described above, since the driving of the pixel circuit according to the embodiment is simple, the complexity of the driving circuit can be reduced and furthermore a slim bezel of the display device can be achieved.

While the embodiment of the present invention has been described with reference to the accompanying drawings, it can be understood by those skilled in the art that the present invention can be embodied in other specific forms without departing from its spirit or essential characteristics. Therefore, the foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A display device comprising:

a display panel including a pixel, a gate line, and a data line;

a first gate driving circuit disposed on a left side of the display panel; and a second gate driving circuit disposed on a right side of the display panel, wherein the pixel comprises a pixel circuit including:

a driving transistor including a first electrode connected to a first node, a gate electrode connected to a second node, and a second electrode connected to a third node, the driving transistor configured to supply a driving current to a light emitting device;

a first transistor disposed between the second node and the third node;

a second transistor disposed between the first node and a data line;

a third transistor disposed between the first node and a first voltage line;

a storage capacitor disposed between the first voltage line and the second node;

a fourth transistor disposed between the third node and a fourth node, the fourth node connected to the light emitting device;

a sixth transistor disposed between the fourth node and a second voltage line;

a seventh transistor disposed between the first node and a third voltage line, and a fifth transistor disposed between the second node and a fourth voltage line, wherein only one of the first gate driving circuit and the second gate driving circuit comprises a light emission control driving circuit configured to output a light emission control signal to the pixel circuit, and wherein the first transistor and the second transistor are configured to receive a first scan signal, and the first transistor is configured to electrically connect the second electrode of the driving transistor to the gate electrode of the driving transistor according to the first scan signal, and the second transistor is configured to supply a voltage of the data line to the first electrode of the driving transistor according to the first scan signal.

2. The display device of claim 1, wherein the third transistor and the fourth transistor are configured to receive the light emission control signal, and the third transistor is configured to apply a voltage of the first voltage line to the first node according to the light emission control signal and the fourth transistor is configured to electrically connect the second electrode of the driving transistor to the light emitting device.

3. The display device of claim 1, wherein the sixth transistor and the seventh transistor are configured to receive a third scan signal, and the sixth transistor is configured to apply a voltage of the second voltage line to the light emitting device according to the third scan signal and the seventh transistor is configured to apply a voltage of the third voltage line to the first electrode of the driving transistor according to the third scan signal.

4. The display device of claim 1, wherein at least one of the first transistor, the second transistor, or the fifth transistor is an oxide semiconductor transistor which comprises an oxide semiconductor material in an active layer.

5. The display device of claim 1, wherein the light emitting device includes an anode electrode, a cathode electrode, and an organic compound layer, and wherein the first transistor is electrically connected between the second node and the third node, and the second transistor is electrically connected between the first node and the data line, the third transistor is electrically connected between the first node and the first voltage line;

the storage capacitor comprises a first electrode and a second electrode, the first electrode of the storage capacitor connected to the first voltage line, and the second electrode of the storage capacitor connected to the second node, the fourth transistor electrically connected between the third node and the fourth node, a sixth transistor electrically connected between the fourth node and the second voltage line; and a seventh transistor electrically connected between the first node and the third voltage line.

6. The display device of claim 1, wherein the first voltage line is a power line.

7. The display device of claim 1, wherein the second voltage line supplies an anode reset voltage.

8. The display device of claim 1, wherein the third voltage line supplies a bias voltage.

9. The display device of claim 1, wherein the display panel is divided into a display area in which the pixel is disposed, a first bezel area on a first side of the display area, and a second bezel area on a second side of the display area; and wherein the first gate driving circuit on the first bezel area and the second gate driving circuit on the second bezel area are asymmetrical with each other.

* * * * *